United States Patent [19]

Martin

[11] 4,292,080
[45] Sep. 29, 1981

[54] CESIUM-STUFFED CORDIERITE CERAMICS

[75] Inventor: Francis W. Martin, Painted Post, N.Y.

[73] Assignee: Corning Glass Works, Corning, N.Y.

[21] Appl. No.: 156,666

[22] Filed: Jun. 5, 1980

[51] Int. Cl.³ .............................................. C03C 3/22
[52] U.S. Cl. ......................................... 501/4; 65/33; 264/332; 501/69
[58] Field of Search .................... 106/39.6, 39.7, 39.8; 65/33; 264/332

[56] References Cited

U.S. PATENT DOCUMENTS

| | | | |
|---|---|---|---|
| 3,833,385 | 9/1974 | Adelsburg et al. | 106/39.6 X |
| 3,881,944 | 5/1975 | Beall et al. | 106/39.6 X |
| 3,926,648 | 12/1975 | Miller | 106/39.6 |

OTHER PUBLICATIONS

Chem. Abstr. 89 Item 10662, "Composition and Properties of Crystallization Products of Cesium Oxide-Magnesium Oxide-Silicon Dioxide Glass".

Primary Examiner—Helen M. McCarthy
Attorney, Agent, or Firm—Clinton S. Janes, Jr.

[57] ABSTRACT

The subject invention is related to the preparation of ceramic bodies wherein the crystal phase consists essentially of cesium-stuffed, hexagonal cordierite. The bodies are capable of use temperatures up to 1600° C., exhibit nearly isotropic axial thermal expansions, and consist essentially, expressed in weight percent on the oxide basis, of about 11–13% MgO, 34–36% $Al_2O_3$, 33–42% $SiO_2$, and 10–22% $Cs_2O$.

2 Claims, 2 Drawing Figures

CESIUM-STUFFED CORDIERITE CERAMICS

BACKGROUND OF THE INVENTION

Cordierite ($2MgO.2Al_2O_3.5SiO_2$) has a structure which is commonly viewed as a two-dimensional framework. Thus, in cordierite, two-dimensional, co-planar sheets consisting of hexagonal rings of tetrahedrally-coordinated cations are perpendicular to the c-axis. One aluminum atom is present in each ring. Alternate layers of the hexagonal ring structure are connected such that two cavities per unit cell are defined by three co-planar $Si_5Al$ rings and the network of Mg octahedra and Al tetrahedra which link the rings. The overall configuration of the framework resembles spheres sliced and ground to yield two hexagon flats per sphere and a repeat unit of two spheres, one above the other, per unit cell. A fundamental feature of this structure is that it contains cavities which are assumed to be unoccupied in the pure material. Cordierite has a positive axial thermal expansion coefficient in the plane of the hexagonal rings and a negative axial thermal expansion coefficient perpendicular to that plane.

Numerous chemical derivatives of cordierite have been synthesized. Those products have generally involved additions of $Al^{+3}$ ions for $Si^{+4}$ ions, thereby changing the $Al^{+3}/Si^{+4}$ ratio and resulting in ring charge imbalance, this charge imbalance being compensated for through an interstitial cation located in a structural cavity. Thus, additional $Al^{+3}$ ions have been substituted on a statistical basis for $Si^{+4}$ ions in the rings and positive charges have been introduced via the addition of monovalent or divalent metal ions to maintain charge balance. Three illustrations of that practice are set out below.

U.S. Pat. No. 3,926,648 discloses the addition of 0.5–2.5% by weight $K_2O$ and/or $Cs_2O$ to glass compositions near the stoichiometry of cordierite to improve the sinterability of such compositions when fine powders thereof are fired to glass-ceramic bodies. Because the inventive products were sought to demonstrate physical properties similar to those exhibited by cordierite, e.g., a coefficient of thermal expansion (25°–1000° C.) of $13-18\times10^{-7}/°C$., a use temperature of 1300° C., and good thermal stability when cycled between room temperature and 1000° C., the maximum total of $K_2O$ and/or $Cs_2O$ was emphasized to be 2.5%. Stated in other words, the addition of small amounts of $K_2O$ and/or $Cs_2O$ permitted the sintering together at lower temperatures of glass powders having the approximate stoichiometry of cordierite into strong glass-ceramic bodies wherein the crystal phase retains the essential physical properties of cordierite.

U.S. Pat. No. 4,015,048 describes the addition of 0.7–5.6 mole percent of a divalent metal oxide selected from the group of BaO, CaO, PbO, and SrO to glass compositions near the stoichiometry of cordierite to improve the sinterability of such compositions when fired as fine powders into a glass-ceramic article. The fired article is non-porous, essentially free from glass, and exhibits a coefficient of thermal expansion (25°–1000° C.) of not over $20\times10^{-7}/°C$.

U.S. Pat. No. 4,194,917 teaches the production of a fired dense ceramic body consisting essentially of 0.3–8% by weight $Y_2O_3$ and/or $CeO_2$ in cordierite. The additions improve the density of the fired product and impart a low coefficient of thermal expansion thereto, i.e., $<30\times10^{-7}/°C$. (25°–1000° C.).

When divalent metal ions are utilized to maintain charge balance in those instances where $Al^{+3}$ ions are substituted for $Si^{+4}$ ions in the cordierite structure, their addition is limited to approximately ½ ion per unit cell, which corresponds to ¼ occupancy of the large cavities. Greater additions lead to the formation of other crystal phases, viz., divalent metal aluminosilicates of which celsian ($BaO.Al_2O_3.2SiO_2$) is illustrative.

In contrast, where monovalent metal ions, for example the alkali metal ions, provide the charge balance, their addition can be in such amounts as to occupy all of the large cavities in the cordierite structure. However, as was observed in U.S. Pat. No. 3,926,648, supra, the inclusion of large amounts of alkali metal ions commonly reduces the thermal stability of the products. That is, those substituted cordierites exhibit a lower liquidus temperature and reduced refractoriness when compared with classic cordierite. Moreover, the thermal expansion behavior of alkali metal-stuffed cordierites has been observed as being generally similar in character to that of stoichiometric cordierite, i.e., they demonstrate a positive a axis expansion and a c axis expansion that is quite negative, especially in the lower temperature regions.

SUMMARY OF THE INVENTION

The instant invention is founded in the discovery that, contrary to prior experience, where at least one-half of the cavities in the cordierite structure are filled with cesium ions, the resultant ceramic body exhibits significantly higher thermal stability. Where the cordierite structure is essentially completely stuffed with cesium ions, differential thermal analysis data have indicated a rise of about 40° C. in thermal stability. Furthermore, the highly-stuffed cesium cordierites demonstate nearly isotropic thermal expansions, i.e., the thermal expansions along both the a and c axes are positive. As a consequence of this phenomenon, the coefficients of thermal expansion are somewhat higher than that of stoichiometric cordierite and other alkali metal-stuffed cordierites (typically about $25\times10^{-7}/°C$. as compared with about $15\times10^{-7}/°C$.

As expressed on the oxide basis in weight percent, cesium will be present in amounts ranging from about 10–22% $Cs_2O$. Stating the mole ratio of classic cordierite to be $4MgO.4Al_2O_3.10SiO_2$, the mole ratios of the inventive $Cs_2O$-stuffed cordierites range between about $4MgO.4.5-5Al_2O_3.8-10SiO_2$. Stoichiometric cordierite is equivalent, in weight percent on the oxide basis, to about 13.6% MgO, 34.9% $Al_2O_3$, and 51.4% $SiO_2$. Accordingly, the inventive compositions will consist essentially, expressed in weight percent on the oxide basis, of about 11–13% MgO, 34–36% $Al_2O_3$, 33–42% $SiO_2$, and 10–22% $Cs_2O$.

The liquidus of the fully-stuffed cesium cordierite has been measured at about 1540° C. Bars of 0.25" cross section, however, have been heated to temperatures in the vicinity of 1600° C. with little deformation or distortion. X-ray diffraction analysis has indicated that, upon heating to sufficiently high temperatures to destroy the cordierite structure, pollucite ($Cs_2O.Al_2O_3.4SiO_2$) is formed. In contrast to stoichiometric cordierite, a low viscosity glassy phase is not developed when the structure is destroyed, presumably because the pollucite crystallization which is developed incorporates the cesium ions and much of the silica.

The unique characteristics of the cesium-stuffed cordierite are believed to be due to the fact that the cesium ion is of exactly the proper dimensions to fully occupy the large cavity between the rings in the cordierite structure. Very good agreement has been noted between observed and calculated X-ray diffraction patterns. The alkali metal-substituted cordierites appear to have larger unit cells than the stoichiometric cordierite, but this seems to be related to $Al_2O_3$ substitution for $SiO_2$ in the rings and has been seen to be relatively independent of the size of the cation occupying positions in the cavities.

The method of the invention contemplates four general steps:

(1) a glass-forming batch of a desired composition is melted;

(2) the melt is simultaneously cooled to a glass and a body of a desired geometry is shaped therefrom;

(3) the glass body is reduced to a powder, the particles thereof generally passing a No. 100 United States Standard Sieve (149 microns);

(4) the powder is shaped into an article of a desired configuration, this shaping being carried out utilizing forming means conventional in the ceramic art, e.g., slip casting, hot pressing, extrusion, dry pressing, etc.;

(5) the shaped article is heated to about 950°–1200° C. for a period of time sufficient to sinter the powder particles together and to cause the growth of cesium-stuffed, hexagonal cordierite crystals therein; and (6) the resultant cyrstalline article is cooled to room temperature.

Preferably, the glass powders of Step 3 will be comminuted to very fine particle sizes, viz., less than a No. 250 United States Standard Sieve (74 microns), since the fineness of grain size improves the sintering behavior and crystal development during the firing of the shaped article. The final articles are predominantly crystalline and the cesium-stuffed, cordierite crystals are relatively fine-grained, i.e., essentially all smaller than 25 microns in diameter.

DESCRIPTION OF THE PREFERRED EMBODIMENTS

Figure 1:
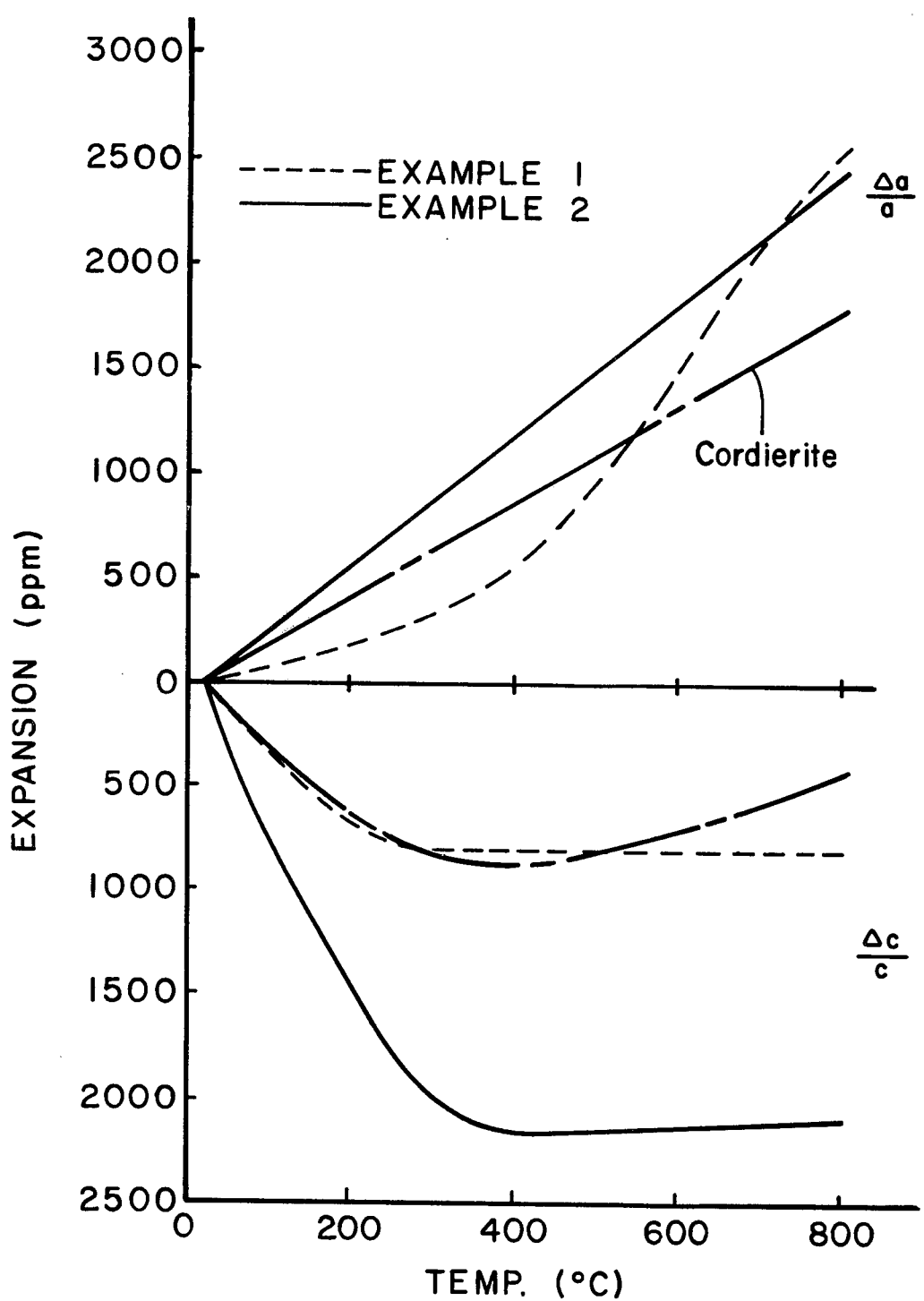
FIG. 1 sets forth graphs depicting the axial thermal expansions of two potassium-substituted cordierite bodies.

The following table recites several glass compositions expressed in parts by weight on the oxide basis. Inasmuch as the sum of the individual constituents totals or closely approximates 100, for practical purposes the values presented can be considered to reflect weight percent. The table also records in parentheses the mole ratios of the components. The actual batch ingredients may be any materials, either the oxides or other compounds, which, when melted together, will be converted into the desired oxide in the proper proportions.

The batch ingredients were compounded, blended together in a ball mill to assist in obtaining a homogeneous melt, and then deposited into platinum crucibles. The crucibles were introduced into a furnace operating at temperatures between about 1650°–1800° C. and the batches melted for about 4–7 hours. Chemical analyses have indicated that up to 5% or more cesium may be volatilized from the melt at those temperatures. Accordingly, it may be necessary to include an additional 5–10% $Cs_2O$ in the batch to compensate therefor. Each melt was subsequently poured in steel molds to form slabs which were subsequently broken up and then pulverized to pass a No. 200 United States Standard Sieve.

The glass powders were thereafter dry pressed into rectangular bars about $3\times0.5\times0.25$ inches utilizing a lubricating binder such as Carbowax 10,000 and the bars fired to a temperature of about 1000° C. for about 1–4 hours to simultaneously sinter the particles into an integral body and develop the desired cesium-stuffed cordierite crystallization therein. Because the dimensions of the bars were relatively small and the configuration thereof uncomplicated, no special precautions were necessary in carrying out the sintering step. Hence, the bars were simply heated at the furnace rate of an electrically-fired furnace from room temperature. That practice permitted volatilization of the vehicle at a sufficient rate to avoid cracking of the bars. When sintering was deemed to be complete, the electric current to the furnace was cut off and the furnace allowed to cool to room temperature with the bars retained therein. A shrinkage of the bars of at least about 10% during the firing step was considered to indicate good sintering practice.

TABLE

|  | 1 | 2 | 3 | 4 | 5 |
|---|---|---|---|---|---|
| MgO | 13.35(4) | 12.94(4) | 11.25(4) | 11.25(4) | 12.39(4) |
| $Al_2O_3$ | 37.98(4.5) | 40.92(5) | 35.56(5) | 35.59(5) | 35.28(5) |
| $SiO_2$ | 44.77(9) | 38.58(8) | 33.53(8) | 33.50(8) | 41.50(8.5) |
| $K_2O$ | 3.90(0.5) | 7.56(1) | — | — | — |
| $Cs_2O$ | — | — | 19.66(1) | 21.63(1.1) | 10.83(0.5) |

X-ray diffraction analyses of the sintered bars indicated hexagonal cordierite as essentially the sole crystal phase. The diffraction patterns did not exactly match that of stoichiometric cordierite, i.e., there were minor differences in spacings and rather major differences in some of the intensities, particularly in the case of cesium stuffing, indicating the inclusion of $K^+$ or $Cs^+$ ions in the crystal structure.

Figure 2:
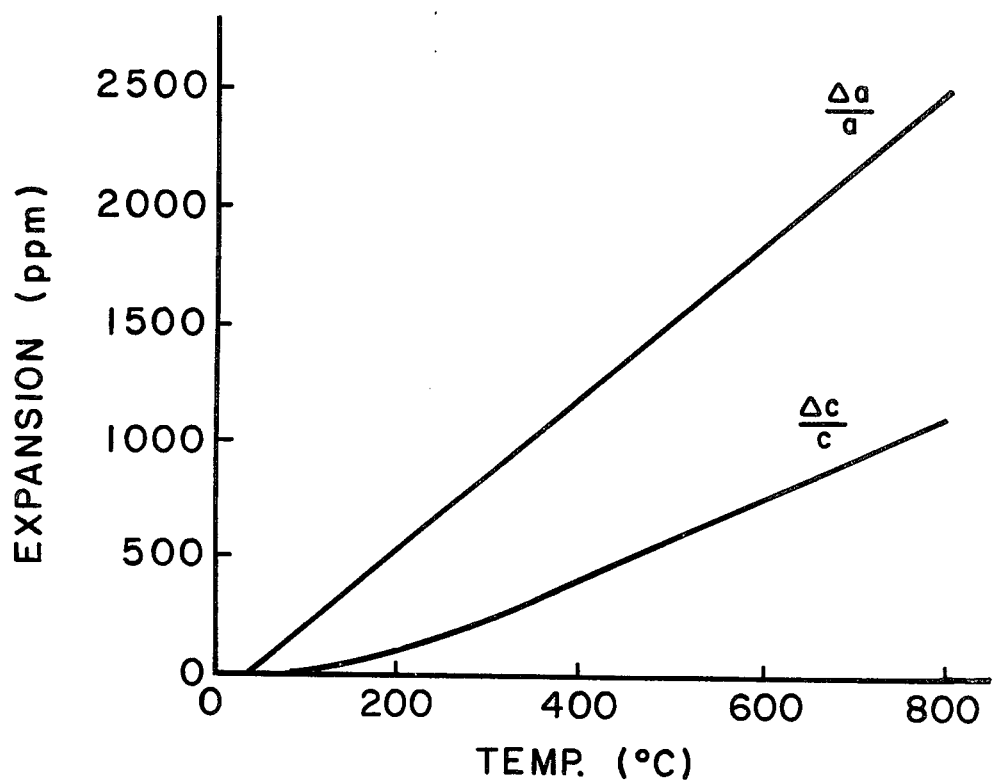
FIG. 2 records a graph describing the axial thermal expansion of a cordierite structure essentially completely stuffed with cesium ions.

The sensitivity of the thermal expansion behavior to the chemistry and the atomic packing arrangement is demonstrated via a comparison of FIGS. 1 and 2. Thus, FIG. 1 depicts the axial thermal expansions of stoichiometric cordierite and those exhibited by Examples 1 and 2 of the above table. As is readily evident, where $K^+$ ions occupy the cavities in the cordierite structure, the characteristic shapes of the axial expansions demonstrated by stoichiometric cordierite are retained. A dramatic change in the character of the c-axis thermal expansion occurs, however, when the cavity in the cordierite structure is occupied by the large $Cs^+$ ion. Thus, in FIG. 2, illustrating Example 3 of the above table, $\Delta c/c$ has changed sign and is positive at all temperatures.

Whereas in the above working examples the crystallization heat treatment consisted of a single dwell period at a particular temperature, it will be appreciated that, in accordance with practices conventional in the art of ceramic manufacture, the heat treatment can comprise exposures to multiple temperatures. Such practice is especially useful to prevent cracking in thick-walled articles.

I claim:

1. A ceramic body, wherein the crystal phase consists essentially of cesium-stuffed, hexagonal cordierite, demonstrating a use temperature up to about 1600° C. and nearly isotropic axial thermal expansions consisting essentially, by weight on the oxide basis, of about 11–13% MgO, 34–36% Al$_2$O$_3$, 33–42% SiO$_2$, and 10–22% Cs$_2$O.

2. A method for making a ceramic body, wherein the crystal phase consists essentially of cesium-stuffed, hexagonal cordierite, demonstrating a use temperature up to about 1600° C. and nearly isotropic axial thermal expansions comprising the steps of:

(a) melting a batch for a glass consisting essentially, by weight on the oxide basis, of about 11–13% MgO, 34–36% Al$_2$O$_3$, 33–42% SiO$_2$, and 10–22% Cs$_2$O;

(b) simultaneously cooling the melt to a glass and shaping a body of a desired configuration therefrom;

(c) the glass body is reduced to particles generally passing a No. 100 United States Standard Sieve;

(d) the particles are shaped into an article of a desired configuration;

(e) the shaped article is heated to about 950°–1200° C. for a period of time sufficient to sinter the particles together and to cause the growth of cesium-stuffed, hexagonal cordierite crystals therein; and (f) the resultant crystalline article is cooled to room temperature.

* * * * *